(12) United States Patent
Enns et al.

(10) Patent No.: US 12,491,809 B2
(45) Date of Patent: Dec. 9, 2025

(54) LOWER LEG SUPPORT DEVICE FOR A VEHICLE SEAT, AND VEHICLE SEAT

(71) Applicant: Adient US LLC, Plymouth, MI (US)

(72) Inventors: Viktor Enns, Kaiserslautern (DE); Thomas Dill, Heiligenmoschel (DE); Wolfgang Pluta, Heiligenmoschel (DE); Erik Dick, St. Julian (DE)

(73) Assignee: Adient US LLC, Plymouth, MI (US)

( * ) Notice: Subject to any disclaimer, the term of this patent is extended or adjusted under 35 U.S.C. 154(b) by 172 days.

(21) Appl. No.: 18/208,917

(22) Filed: Jun. 13, 2023

(65) Prior Publication Data

US 2023/0398917 A1    Dec. 14, 2023

(30) Foreign Application Priority Data

Jun. 13, 2022  (DE) .................. 10 2022 114 758.4
Aug. 10, 2022  (DE) .................. 10 2022 120 164.3

(51) Int. Cl.
| | |
|---|---|
| B60N 2/90 | (2018.01) |
| A47C 1/035 | (2006.01) |
| A47C 1/0355 | (2013.01) |
| A47C 1/037 | (2006.01) |
| A47C 7/50 | (2006.01) |

(52) U.S. Cl.
CPC ............. B60N 2/995 (2018.02); B60N 2/933 (2018.02); *A47C 1/035* (2013.01); *A47C 1/0355* (2013.01); *A47C 1/037* (2013.01); *A47C 7/506* (2013.01); *A47C 7/5066* (2018.08)

(58) Field of Classification Search
CPC ..... A47C 7/5066; A47C 7/506; A47C 1/0355; A47C 1/035; A47C 1/037; B60N 2/995; B60N 2/933
See application file for complete search history.

(56) References Cited

U.S. PATENT DOCUMENTS

| | | | |
|---|---|---|---|
| 1,626,069 A | | 4/1927 | Beech |
| 2,664,942 A | * | 1/1954 | Spear ................... A47C 1/0347 297/89 |
| 2,774,412 A | * | 12/1956 | Luckhardt ............ A47C 1/0345 297/75 |
| 3,001,817 A | | 9/1961 | Fletcher |
| 3,244,449 A | * | 4/1966 | Re ........................ A47C 1/0355 297/75 |

(Continued)

FOREIGN PATENT DOCUMENTS

| | | |
|---|---|---|
| CN | 205097988 U | 3/2016 |
| CN | 209176548 U | 7/2019 |

(Continued)

OTHER PUBLICATIONS

German Patent Office 1st Office Action for application No. 10 2022 120 164.3, dated May 9, 2023, 6 pages, Munich Germany.

*Primary Examiner* — Syed A Islam
(74) *Attorney, Agent, or Firm* — Marshall & Melhorn, LLC

(57) ABSTRACT

A lower leg support device for a vehicle seat may have a first cushion carrier, a second cushion carrier, which is connected in an articulated manner to the first cushion carrier, and a coupling gear for transferring the first cushion carrier and the second cushion carrier from a non-use position to a use position. The coupling gear is able to be driven by a drive device. A vehicle seat may have the lower leg support device.

17 Claims, 10 Drawing Sheets

(56) References Cited

U.S. PATENT DOCUMENTS

| | | | | |
|---|---|---|---|---|
| 3,537,747 | A * | 11/1970 | Rogers, Jr. | A47C 1/0355 297/85 L |
| 3,652,125 | A * | 3/1972 | Rogers, Jr. | A47C 1/037 297/403 |
| 3,790,211 | A * | 2/1974 | Caldwell | A47C 7/506 297/75 |
| 3,865,432 | A * | 2/1975 | Rogers, Jr. | A47C 1/037 297/316 |
| 3,874,724 | A * | 4/1975 | Re | A47C 1/0352 297/318 |
| 4,915,444 | A | 4/1990 | Rogers, Jr. | |
| 5,013,084 | A * | 5/1991 | May | A47C 1/0355 297/86 |
| 5,090,768 | A * | 2/1992 | Re | A47C 7/506 297/75 |
| 5,388,886 | A * | 2/1995 | LaPointe | A47C 1/0345 297/85 L |
| 5,503,453 | A * | 4/1996 | Saul | A47C 1/0345 297/89 |
| 6,227,489 | B1 * | 5/2001 | Kitamoto | B64D 11/0643 244/118.6 |
| 7,404,602 | B2 * | 7/2008 | Okada | B60N 2/0284 297/284.11 |
| 7,850,232 | B2 * | 12/2010 | Casteel | A47C 1/0352 297/85 L |
| 9,295,333 | B2 * | 3/2016 | Yin | A47C 7/5068 |
| 10,434,919 | B2 * | 10/2019 | Kimura | B60N 2/686 |
| 10,829,008 | B2 * | 11/2020 | Sasaki | B60N 2/1615 |
| 11,065,996 | B2 * | 7/2021 | Ito | B60N 2/02246 |
| 11,772,536 | B1 * | 10/2023 | Maloney | B60N 2/10 297/89 |
| 11,904,745 | B2 * | 2/2024 | Line | B60N 2/309 |
| 12,090,905 | B2 * | 9/2024 | Maloney | B60N 2/995 |
| 2011/0043005 | A1 * | 2/2011 | Fischer | A47C 7/5066 297/423.3 |
| 2013/0161989 | A1 | 6/2013 | Ito | |
| 2013/0313882 | A1 * | 11/2013 | Yin | B60N 2/995 297/423.22 |
| 2019/0223599 | A1 | 7/2019 | Garland | |
| 2023/0202357 | A1 * | 6/2023 | Tang | B60N 2/68 297/316 |
| 2023/0398913 | A1 * | 12/2023 | Runde | B60N 2/995 |

FOREIGN PATENT DOCUMENTS

| | | | |
|---|---|---|---|
| CN | 211335667 | U | 8/2020 |
| CN | 114179688 | A | 3/2022 |
| CN | 114228578 | B | 3/2022 |
| DE | 3718645 | A1 | 3/1988 |
| DE | 10341845 | A1 | 3/2005 |
| DE | 60301423 | T2 | 6/2006 |
| DE | 102010030553 | A1 | 12/2011 |
| DE | 102013102699 | A1 | 11/2013 |
| DE | 102014117610 | A1 | 1/2016 |
| DE | 102016215741 | A1 | 3/2018 |
| DE | 102016015170 | A1 | 6/2018 |
| DE | 102018203731 | A1 | 9/2019 |
| DE | 102018203732 | A1 | 9/2019 |
| DE | 102018122198 | A1 | 3/2020 |
| JP | 2001146167 | A1 | 2/2001 |
| JP | 2009125412 | A1 | 6/2009 |
| JP | 2010246805 | A1 | 11/2010 |
| WO | 2020114946 | A1 | 6/2020 |
| WO | 2020207835 | A1 | 10/2020 |

* cited by examiner

LOWER LEG SUPPORT DEVICE FOR A VEHICLE SEAT, AND VEHICLE SEAT

FIELD

The invention relates to a lower leg support device for a vehicle seat, and to a vehicle seat.

BACKGROUND

DE 10 2018 122 198 A1 discloses an actuating drive for a motor vehicle, in particular for a motor vehicle seat, having an electric motor which has an output shaft; a gearbox which has a spindle nut and a gearbox housing and is connected to the output shaft; having a spindle which engages with the spindle nut, and having a mounting which at least partially comprises the gearbox housing.

Known from WO 2020/207835 A1 is a vehicle seat having height adjustment kinematics having, on each of two seat sides arranged offset with respect to each other in a transverse direction, in each case a four-joint arrangement and an adjustment arm, each of the two four-joint arrangements in each case having a base, a side part, a front link and a rear link as transmission members of the four-joint arrangement, wherein a first rotary joint connects the base pivotably to the rear link, a second rotary joint connects the rear link pivotably to the side part, a third rotary joint connects the side part pivotably to the front link, and a fourth rotary joint connects the front link pivotably to the base, wherein each of the two four-joint arrangements is in each case adjustable by one of the two adjustment arms, wherein a drive device having exactly one geared motor drives the two adjustment arms.

WO 2020/114946 A1 discloses a longitudinal adjuster for a vehicle seat having at least one pair of rails, which has a seat rail which is connectable to the vehicle seat and a floor rail which is connectable to a vehicle floor and on which the seat rail is guided so as to be displaceable along a longitudinal direction. The longitudinal adjuster has a drive device for adjusting the seat rail along the longitudinal direction relative to the floor rail, wherein the drive device has a spindle which is fixed with respect to the floor rail or with respect to the seat rail, a rotatable spindle nut which is mounted on the spindle via a threaded engagement, and an electric motor which is operatively connected to the spindle nut for driving of the spindle nut. An output-proximal output shaft of the electric motor is oriented parallel to the spindle.

In an autonomously driving motor vehicle a driver does not, or not continually, have to carry out steering and/or braking and/or acceleration activities during the operation of the motor vehicle, but the motor vehicle is able to be operated independently of the actions of a driver. Therefore, the driver can assume a more comfortable position during the autonomous travel than in conventional vehicles. Known from DE 10 2018 203 731 A1 is a vehicle seat, in particular for an autonomously driving motor vehicle, which can assume an inclined position in which a seat part and a backrest have an angle which enables a partial reclined position of the vehicle occupant during an autonomous driving operation. In the upright position of the vehicle seat, the driver can assume control of the vehicle once the autonomous driving operation has been switched off.

DE 10 2013 102 699 B4 discloses a foldable leg rest comprising a sliding base, a first folding assembly, a second folding assembly, a first stepped drive mechanism and a second stepped drive mechanism. The sliding base comprises a sliding frame. The first folding assembly comprises a first frame which is centrally connected to the sliding frame. The second folding assembly comprises a second frame which is centrally connected to the first frame. During use, the first stepped drive mechanism controls the drive of the first frame so as to rotate relative to the sliding frame, and the second stepped drive mechanism controls the drive of the second frame so as to rotate relative to the first frame. To this end, the legs of a seated person can be stretched and be placed on the folding groups so that the comfort level is increased and tiredness is minimized.

DE 10 2016 215 741 A1 discloses a lower leg support device for a vehicle seat, having a base and a support part which is mounted to as to be pivotable relative to the base about a pivot axis, wherein an angular position of the support part relative to the base is adjustable between a non-use position and at least one use position, and an overload safeguard which in the event of an excessive load acting on the support part enables the support part to be pivoted in the direction of the non-use position.

SUMMARY

The invention is based on the object of providing a lower leg support device having a two-part cushion carrier for a vehicle seat, which by way of an ideally small number of drive devices is able to be transferred from a non-use position to a use position and vice versa. Moreover to be provided is a vehicle seat, in particular for an autonomously driving motor vehicle, having a lower leg support device according to the invention. The lower leg support device in the non-use position is in particular to be able to be stowed in a space-saving manner. In particular, the vehicle seat is to be able to assume an inclined position in which a seat part and a backrest have an angle that enables a partially reclined position of a vehicle occupant, in particular vehicle driver, in particular during an autonomous driving operation. Aside from the possibility of assuming an inclined position, the vehicle seat is in particular also to have a seat height adjuster and preferably also a seat face incline adjuster.

The difference between a seat face incline adjustability and providing an inclined position lies in that in the case of a seat face incline adjustment a change in an inclination angle of the seat face takes place, whereas an inclination angle of the backrest is not changed, while when assuming an inclined position the inclination angle of the seat face as well as the inclination angle of the backrest are changed.

The object is achieved by a lower leg support device for a vehicle seat, the lower leg support device having a first cushion carrier, a second cushion carrier which is connected in an articulated manner to the first cushion carrier, and a coupling gear for transferring the first cushion carrier and the second cushion carrier from a non-use position to a use position, wherein the coupling gear is able to be driven by a drive device.

The coupling gear can have a drive linkage, a support linkage, a coupling member and a couple. The coupling gear can be able to be articulated on a seat platform by the drive linkage and the support linkage. The drive linkage can be able to be driven by the drive device.

The support linkage can be fixedly connected to the first cushion carrier. The support linkage can be mounted on the seat platform, in particular on a tube of the seat platform, so as to be pivotable by a joint. The drive linkage can be connected in an articulated manner to the support linkage by the coupling member. The coupling member and the coupler can be connected to one another by a joint. The second cushion carrier can be connected to the coupler so as to be pivotable by a joint.

The drive linkage can have a first linkage part and a second linkage part. The two linkage parts can be co-rotationally connected to one another up to a critical load. The two linkage parts can be co-rotationally connected to one another up to a critical load by a spring device, in particular a leg spring.

When viewed in a transverse direction, the lower leg support device can on both sides have in each case one coupling gear. The two coupling gears can have identical actions. The two coupling gears can be mirror symmetrical in relation to one another. One of the two coupling gears can be disposed on a right side of the vehicle seat, and the other of the two coupling gears can be disposed on the left side of the vehicle seat. Each of the two coupling gears can be able to be driven by exactly one common drive device. Alternatively, each of the two coupling gears can be assigned a dedicated drive device.

The two coupling gears can be activatable by exactly one drive device. When viewed in the transverse direction, the two coupling gears on both sides can be activatable by exactly one drive device. The drive device can be an actuating drive of a vehicle seat, which by the lower leg support device is able to be upgraded to a vehicle seat according to the invention. This saves costs and installation space for a separately configured drive device.

The drive device can be an actuating drive of a vehicle seat by which the vehicle seat is able to be driven so as to be transferred to an inclined position.

The first cushion carrier in the non-use position is preferably pivoted in such a manner about an axis running parallel to the transverse direction that an upholstered surface of a first upholstery part fastened to the first cushion carrier points predominantly towards the front. Predominantly towards the front means that a surface normal protruding away from a centre of the surface of the first upholstery part, conjointly with the longitudinal direction, encloses an angle of less than 30 degrees.

The second cushion carrier in the non-use position is preferably pivoted in such a manner about an axis running parallel to the transverse direction that an upholstered surface of the second upholstery part fastened to the second cushion carrier points predominantly downwards. Predominantly downwards means that a surface normal protruding away from a centre of the surface of the second upholstery part, conjointly with the vertical direction, encloses an angle of less than 30 degrees.

In the use position of the lower leg support device, the surfaces of the first upholstery part and of the second upholstery part point predominantly upwards. Predominantly upwards means that a surface normal protruding in each case from a centre of the surfaces of the first and of the second upholstery part, conjointly with the vertical direction, encloses an angle of less than 30 degrees.

The object is moreover achieved according to the invention by a vehicle seat, in particular for an autonomously driving motor vehicle, the vehicle seat having a lower leg support device according to the invention. The vehicle seat according to the invention can be used in an autonomously driving motor vehicle as well as in a conventional vehicle.

The vehicle seat can have a seat platform and a backrest articulated on the seat platform. The seat platform can have a base, a seat frame, and an adjustment kinematics which is effective between the base and the seat frame. The adjustment kinematics can be embodied as a five-joint kinematics.

The adjustment kinematics can have a first front linkage, a second front linkage, and a rear linkage. The first front linkage can be articulated on the base so as to be pivotable about a first rotation axis. A first end region of the first front linkage can be articulated on the base so as to be pivotable about the first rotation axis.

The second front linkage can be articulated on the first front linkage so as to be pivotable about a second rotation axis. A first end region of the second front linkage can be articulated on a second end region of the first front linkage so as to be pivotable about the second rotation axis. The second front linkage can be articulated on the seat frame so as to be pivotable about a third rotation axis. A second end region of the second front linkage can be articulated on the seat frame so as to be pivotable about the third rotation axis.

The rear linkage can be articulated on the seat frame so as to be pivotable about a fourth rotation axis. A first end region of the rear linkage can be articulated on the seat frame so as to be pivotable about the fourth rotation axis. The rear linkage can be articulated on the base so as to be pivotable about a fifth rotation axis. A second end region of the rear linkage can be articulated on the base so as to be pivotable about the fifth rotation axis.

The first rotation axis can be disposed below the second rotation axis. The first rotation axis can be disposed below the third rotation axis. The first rotation axis can be disposed in front of the fourth rotation axis. The first rotation axis can be disposed in front of the fifth rotation axis.

The second the rotation axis can be disposed below the third rotation axis. The second rotation axis can be disposed in front of the fourth rotation axis. The second rotation axis can be disposed in front of the fifth rotation axis.

The third rotation axis can be disposed in front of the fourth rotation axis. The third rotation axis can be disposed in front of the fifth rotation axis. The fifth rotation axis can be disposed below the fourth rotation axis.

In particular for providing a height-adjustment function, an angle between the first front linkage and the base, and an angle between the rear linkage and the base, can be variable by a first actuating drive, wherein an angle between the second front linkage and the seat frame remains constant.

The first actuating drive can have an electric motor and a gearbox. The first actuating drive can have an electric motor, a gearbox, a spindle nut and a spindle. The first actuating drive can connect the rear linkage and the base to one another at an adjustable angle. The first actuating drive can connect the rear linkage and the base to one another at an adjustable angle and directly, i.e. without intervening further gearbox members. A spindle of the first actuating drive can be articulated on the rear linkage so as to be pivotable between the fourth and the fifth rotation axis, wherein the gearbox of the first actuating drive can be fastened to the base.

In particular for providing an inclined position of the seat frame and the backrest, an angle between the second front linkage and the seat frame can be variable by a second actuating drive. The second actuating drive can have an electric motor and a gearbox. The second actuating drive can have an electric motor, a gearbox, a spindle nut and a spindle. A spindle of the second actuating drive can be articulated on a connecting tube that connects the two front linkages, so as to be pivotable eccentrically in relation to the third rotation axis, wherein the gearbox of the first actuating drive can be fastened to the seat frame.

The second actuating drive can moreover serve as a drive device of the lower leg support device. The seat frame and the backrest can be able to be transferred to the inclined position and back to the upright position, and the lower leg support device can be able to be transferred to the use position thereof and back to the non-use position thereof, by the second actuating drive.

In particular for providing a seat face inclination adjuster, a seat face cushion carrier can be articulated on the seat frame so as to be pivotable, in particular about a sixth rotation axis. An angle between the seat face cushion carrier and the seat frame can be adjustable by a third actuating drive.

The sixth rotation axis can be disposed behind the first rotation axis. The sixth rotation axis can be disposed behind the second rotation axis. The sixth rotation axis can be disposed behind the third rotation axis. The sixth rotation axis can be disposed in front of the fourth rotation axis. The sixth rotation axis can be disposed in front of the fifth rotation axis.

The base can have an adapter. The adapter can be configured on or fastened to a seat rail of a base configured as a longitudinal adjuster. The longitudinal adjuster can comprise at least the one seat rail and a floor rail which is connectable to a vehicle floor and on which the seat rail is guided so as to be displaceable. The longitudinal adjuster can have a fourth actuating drive for displacing the seat rail relative to the floor rail.

In summary, and in other words, provided by the invention is a winding-capable lower leg support (lower leg support device) which is particularly interesting for seats having small block dimensions and a relax function (inclined position). The winding-capable lower leg support has a kinematics which achieves folding and winding of the lower leg support so as to achieve a comfortable length of the lower leg support.

The winding-capable lower leg support is preferably coupled to a drive of the relax function. However, the latter is not mandatory; the lower leg support may also be activated by a dedicated drive.

DESCRIPTION OF THE FIGURES

Embodiments of the invention are explained in greater detail below, with reference to the accompanying drawings.

DETAILED DESCRIPTION

Figure 1:
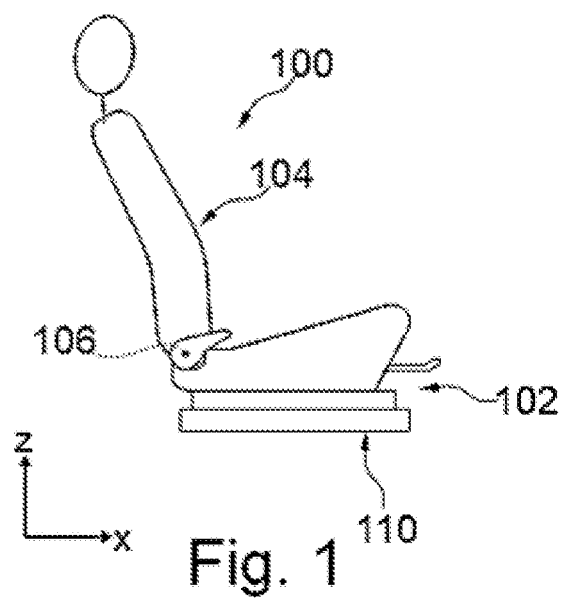
FIG. 1: shows a highly schematic lateral view of a vehicle seat which by a lower leg support device according to the invention is able to be upgraded to a vehicle seat according to the invention.
Figure 2:
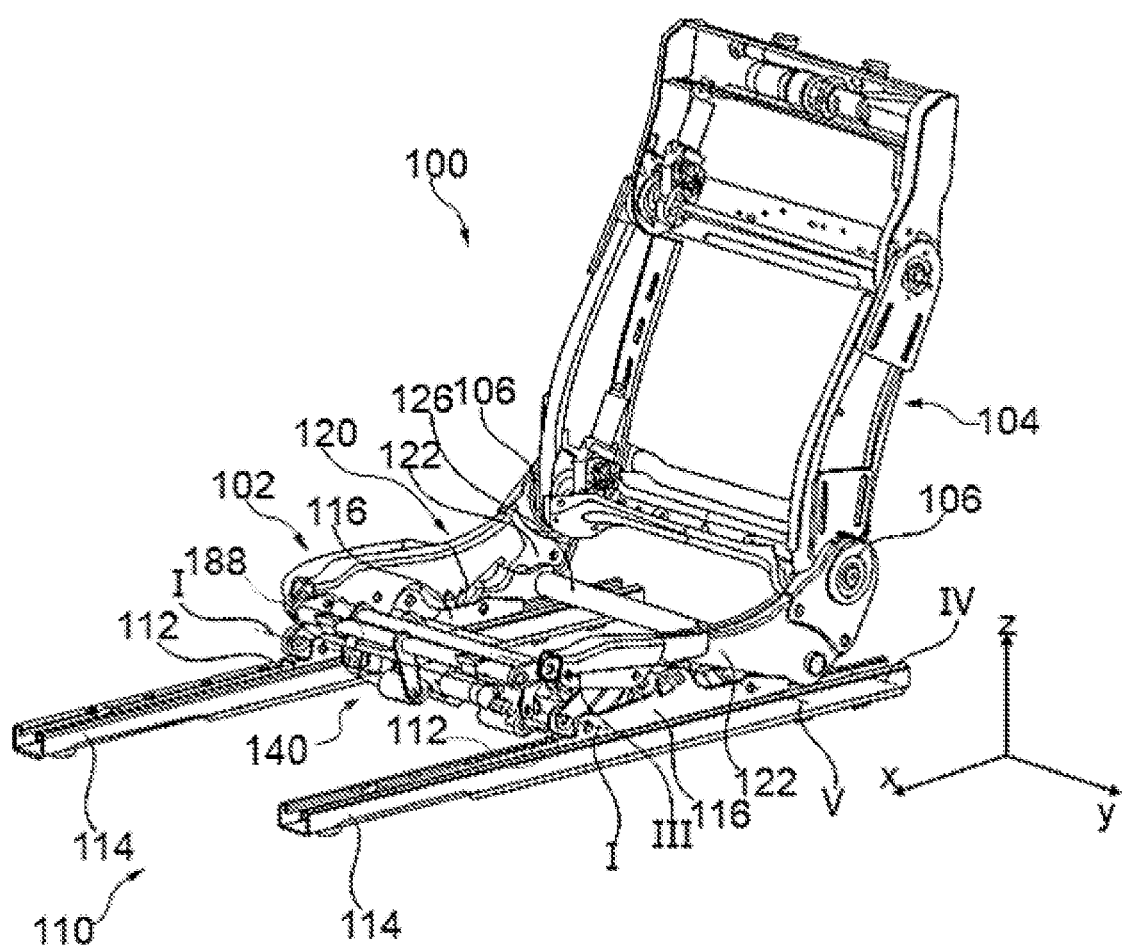
FIG. 2: shows a perspective of a vehicle seat in a non-upholstered state, which by a lower leg support device according to the invention is able to be upgraded to a vehicle seat according to the invention.
Figure 3:
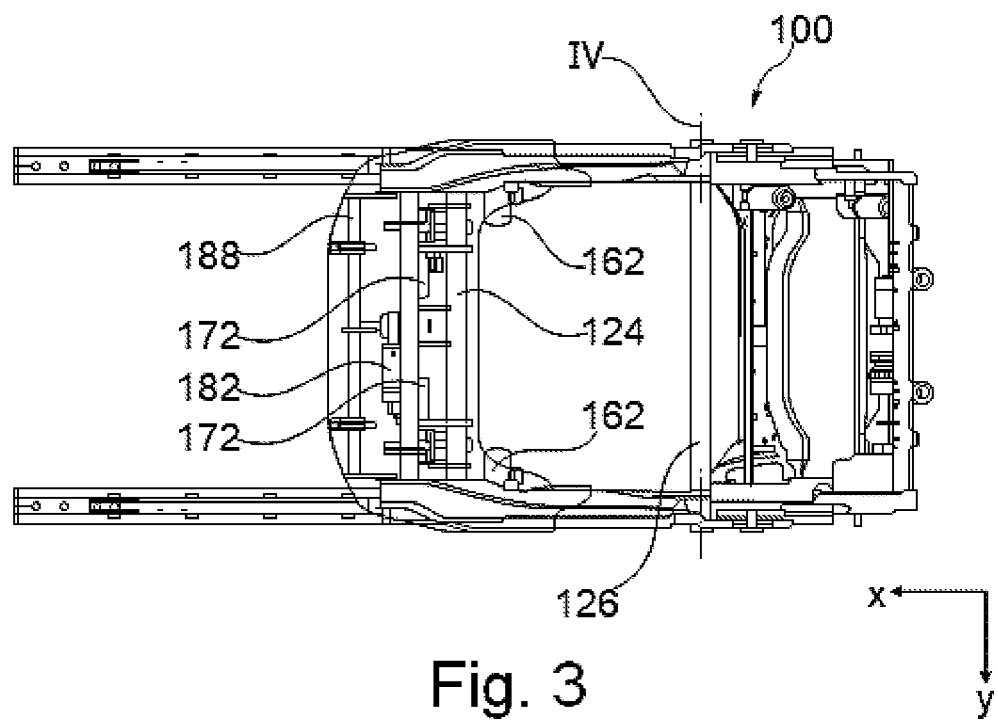
FIG. 3: shows a view from above onto the vehicle seat from FIG. 2.
Figure 4:
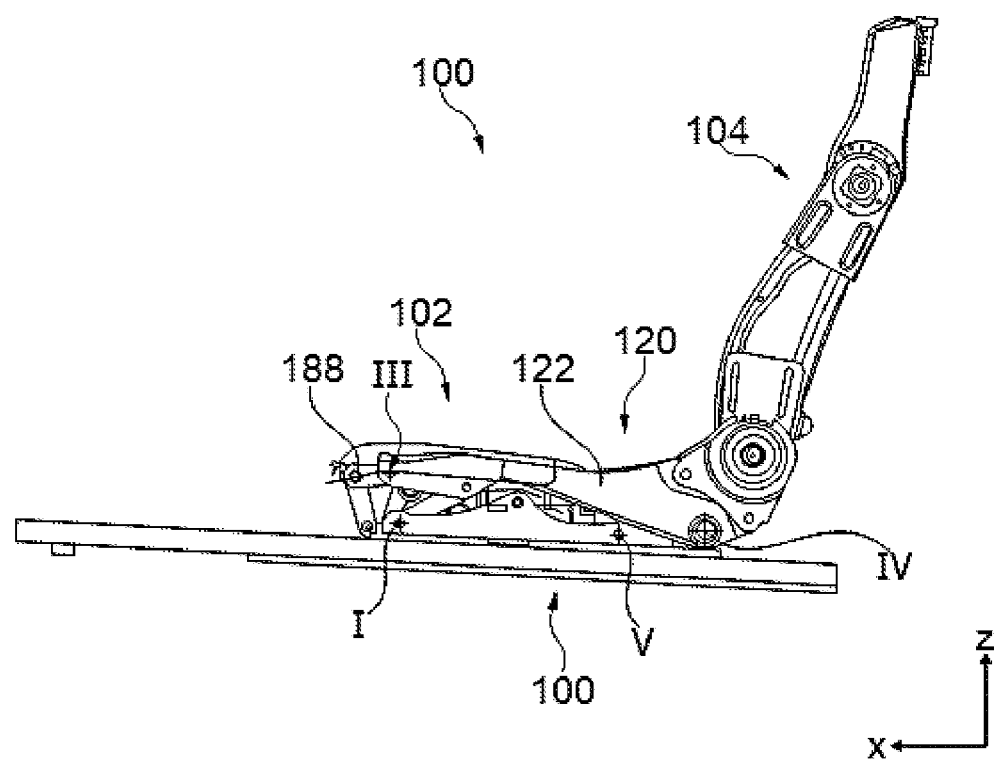
FIG. 4: shows a lateral view of the vehicle seat from FIG. 2, wherein the vehicle seat is situated in a lower height-adjusted position and in an upright position.
Figure 5:
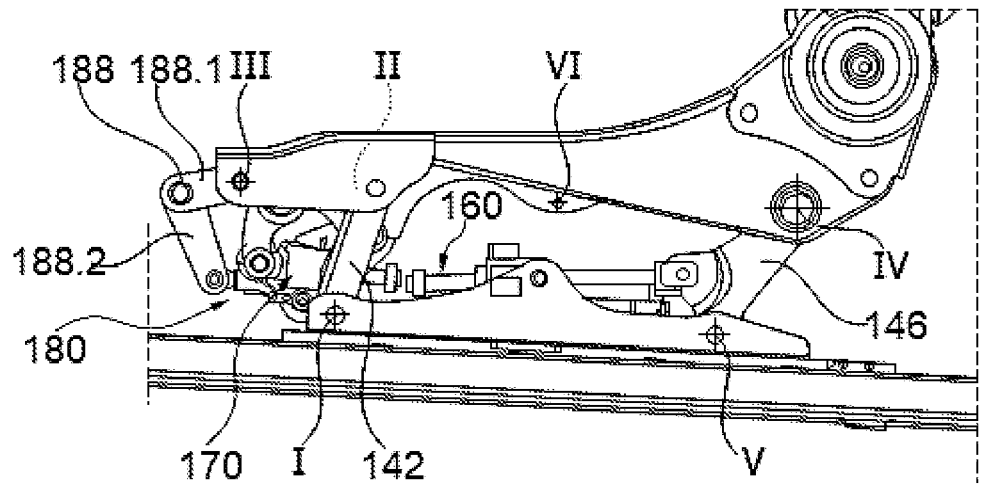
FIG. 5: shows a lateral view of the vehicle seat from FIG. 2, wherein the vehicle seat is situated in an upper height-adjusted position and in an upright position.
Figure 6:
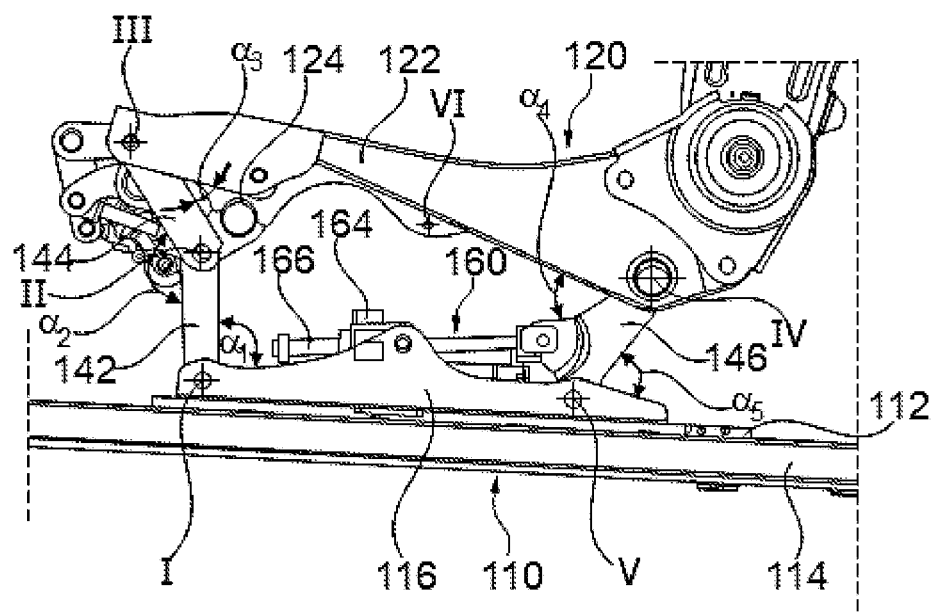
FIG. 6: shows a lateral view of the vehicle seat from FIG. 2, wherein the vehicle seat is situated in an upper height-adjusted position and in an inclined position.
Figure 7:
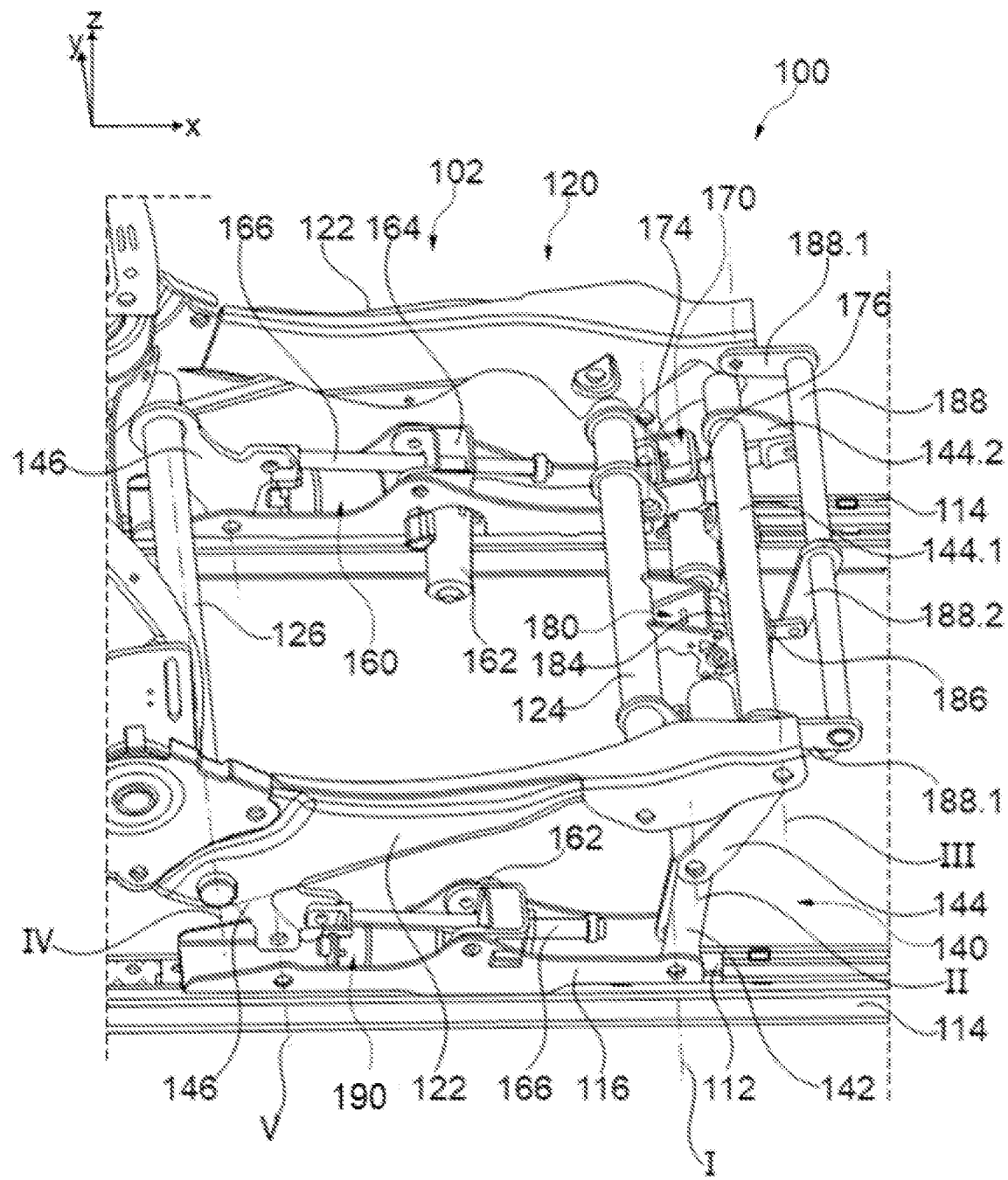
FIG. 7: shows a perspective view of the vehicle seat from FIG. 2, wherein the vehicle seat is situated in an upper height-adjusted position and in an inclined position.
Figure 8:
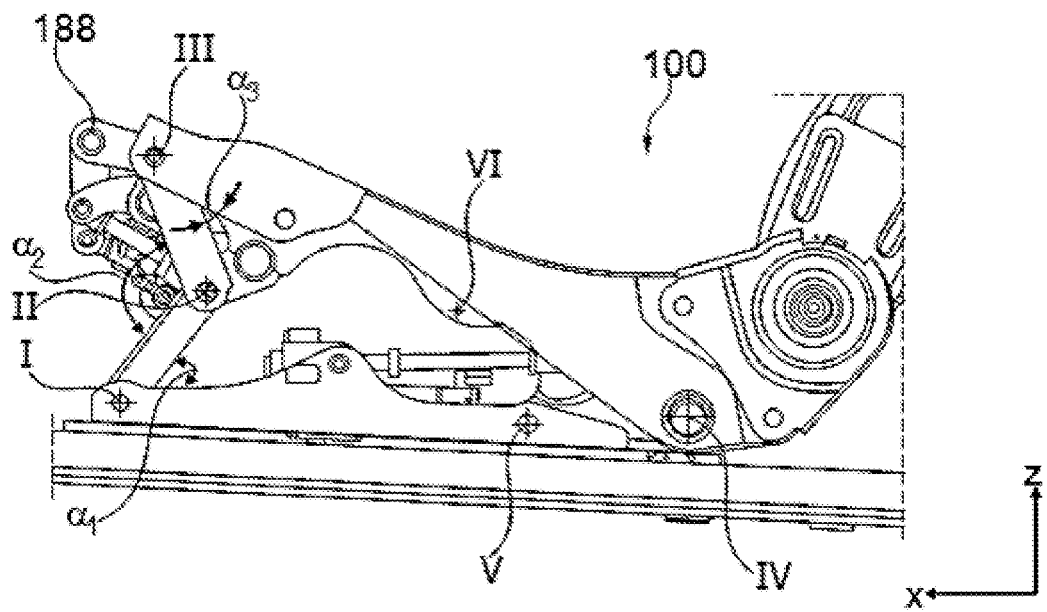
FIG. 8: shows a lateral view of the vehicle seat from FIG. 2, wherein the vehicle seat is situated in a lower height-adjusted position and in an inclined position.
Figure 9:
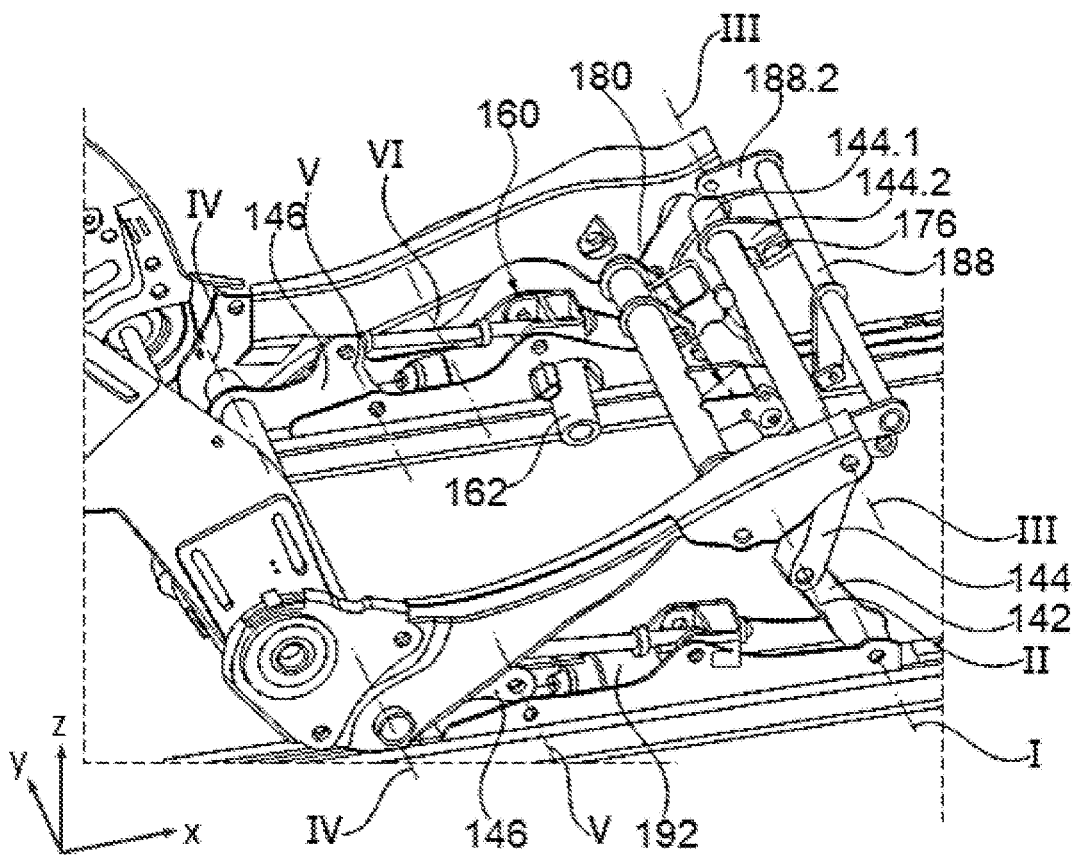
FIG. 9: shows a perspective view of the vehicle seat from FIG. 2, wherein the vehicle seat is situated in a lower height-adjusted position and in an inclined position.
Figure 10:
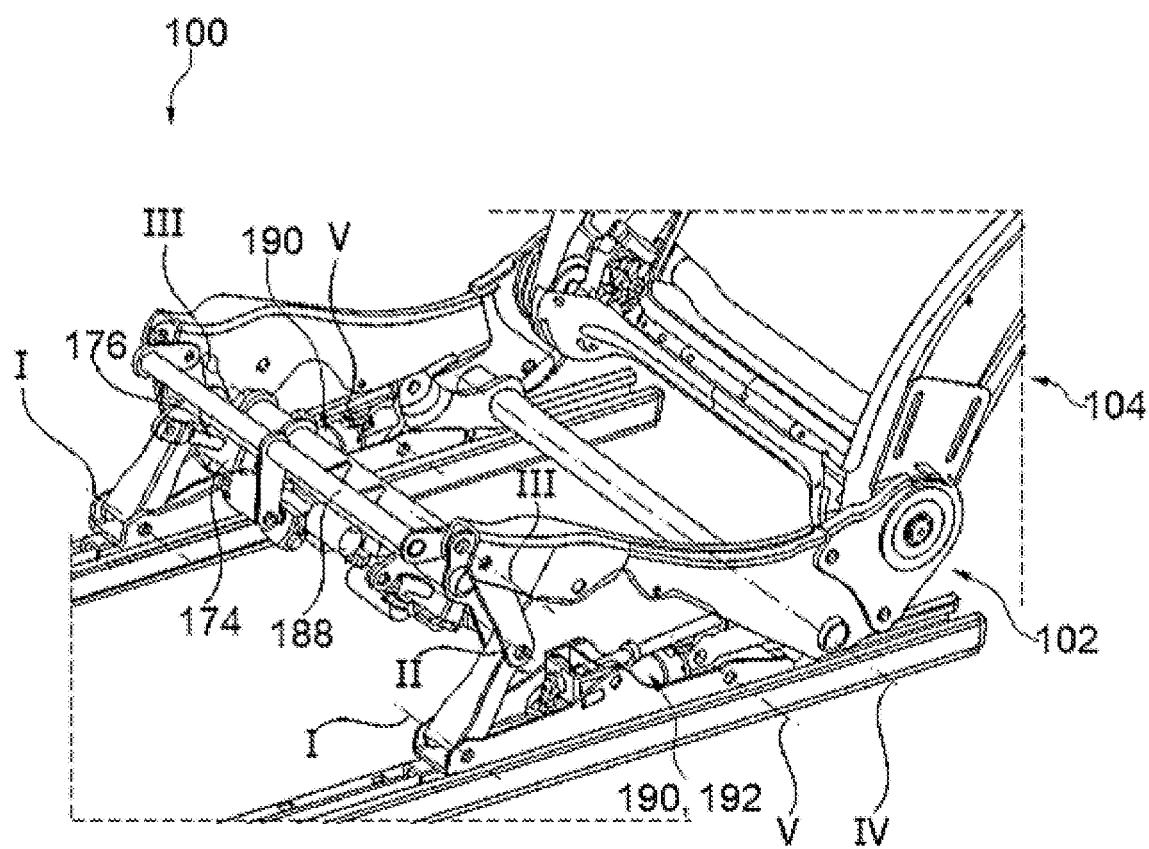
FIG. 10: shows a further perspective view of the vehicle seat from FIG. 2, wherein the vehicle seat is situated in a lower height-adjusted position and in an inclined position.
Figure 11:
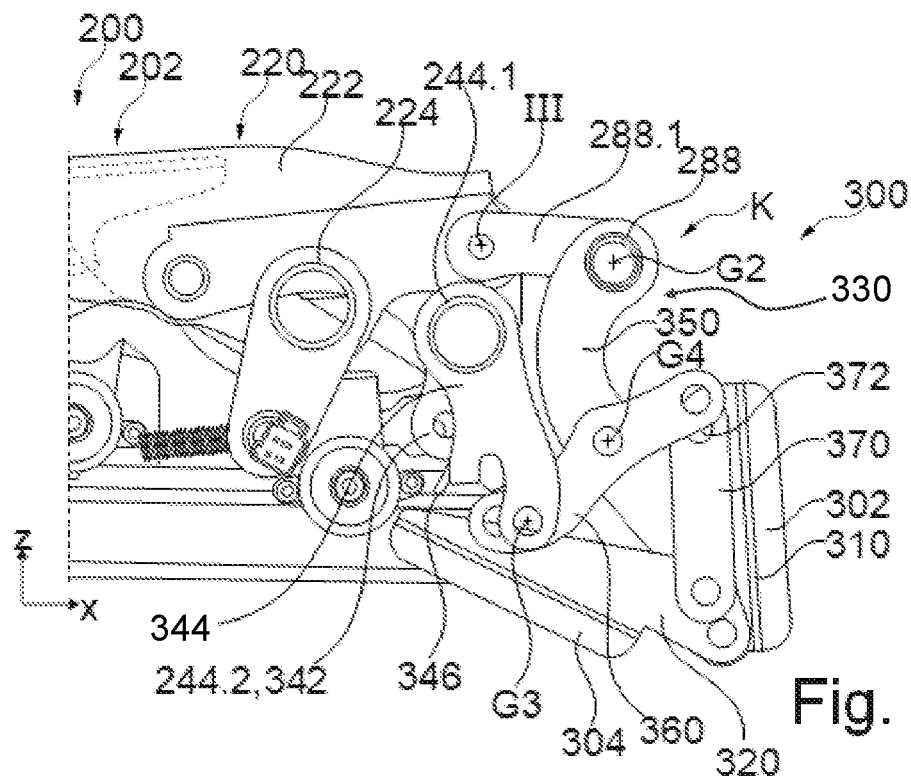
FIG. 11: shows a fragmented lateral view of a vehicle seat according to the invention, having a lower leg support device according to the invention, illustrated in a non-use position.
Figure 12:
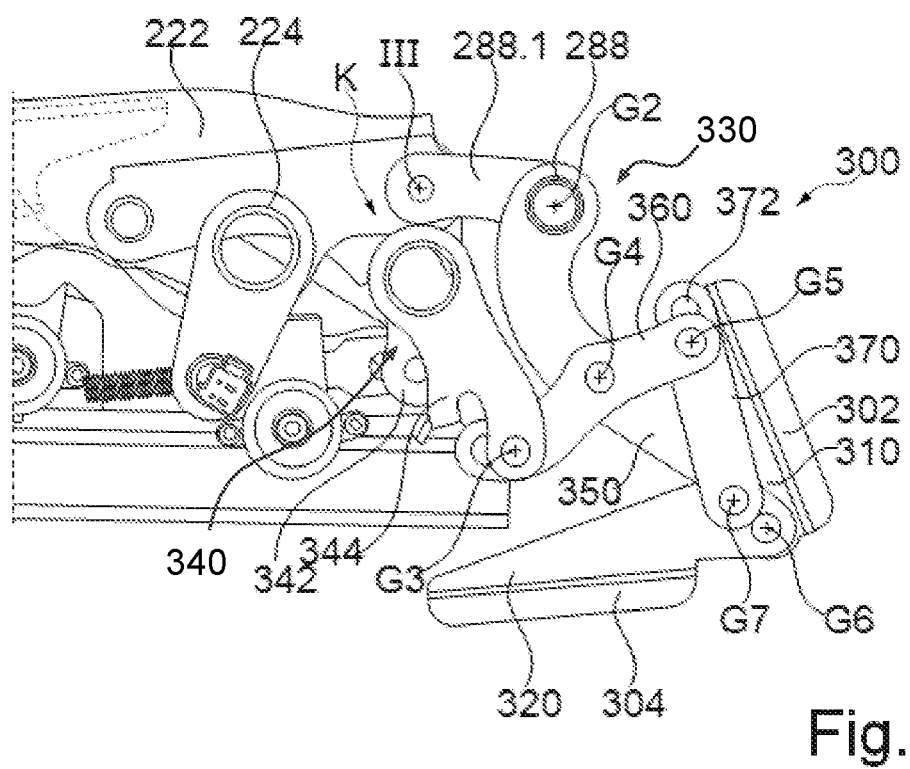
FIG. 12: shows a fragmented lateral view of the vehicle seat and of the lower leg support device from FIG. 11, illustrated during a transition from the non-use position to a use position.
Figure 13:
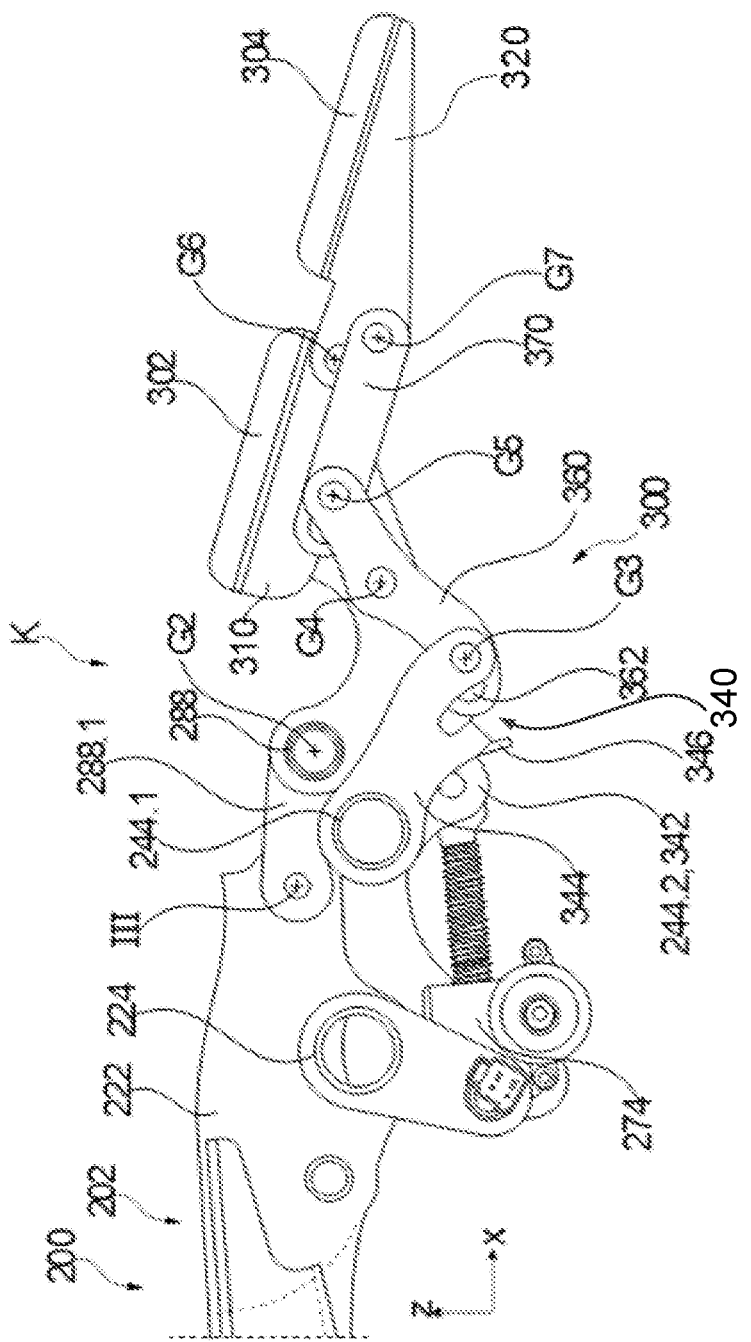
FIG. 13: shows a fragmented lateral view of the vehicle seat and of the lower leg support device from FIG. 11, illustrated in the use position.
Figure 14:
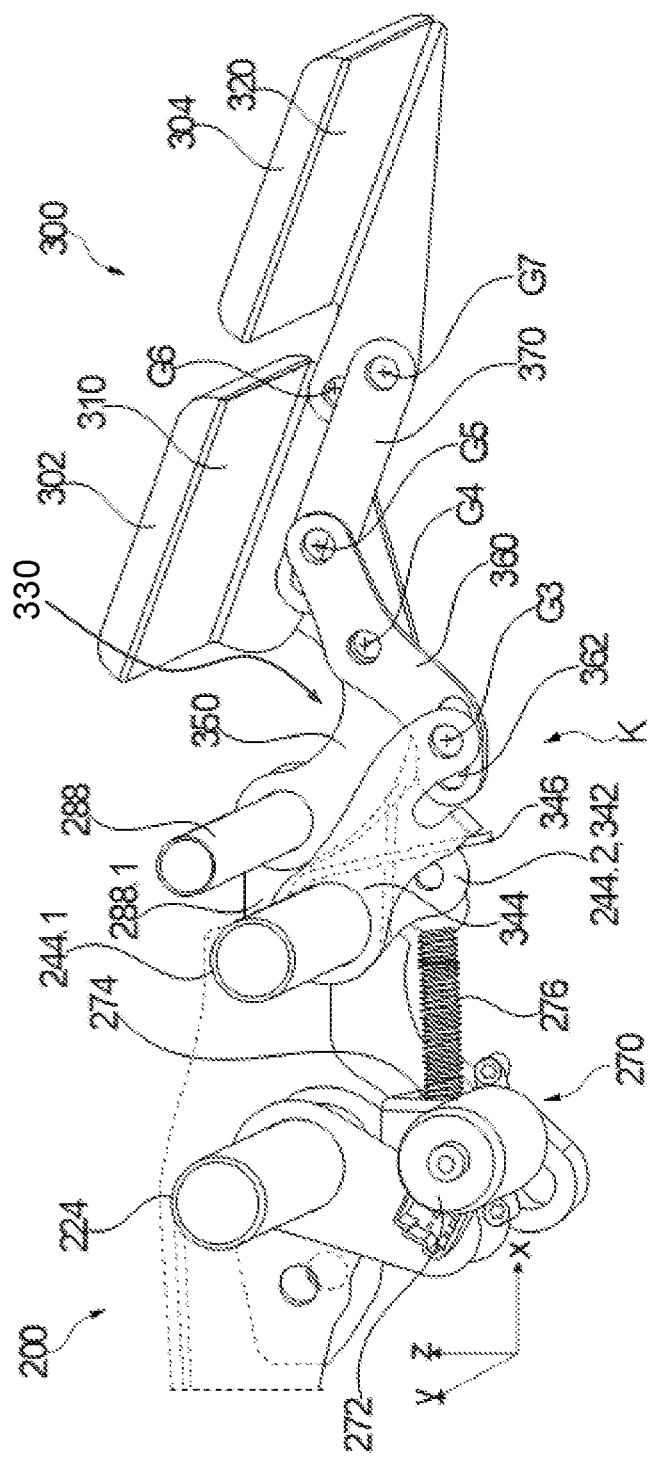
FIG. 14: shows a fragmented, perspective sectional illustration through the vehicle seat and the lower leg support device from FIG. 11, illustrated in the use position, wherein a sectional plane runs perpendicularly to a transverse direction and only one side of the seat is illustrated.
Figure 15:
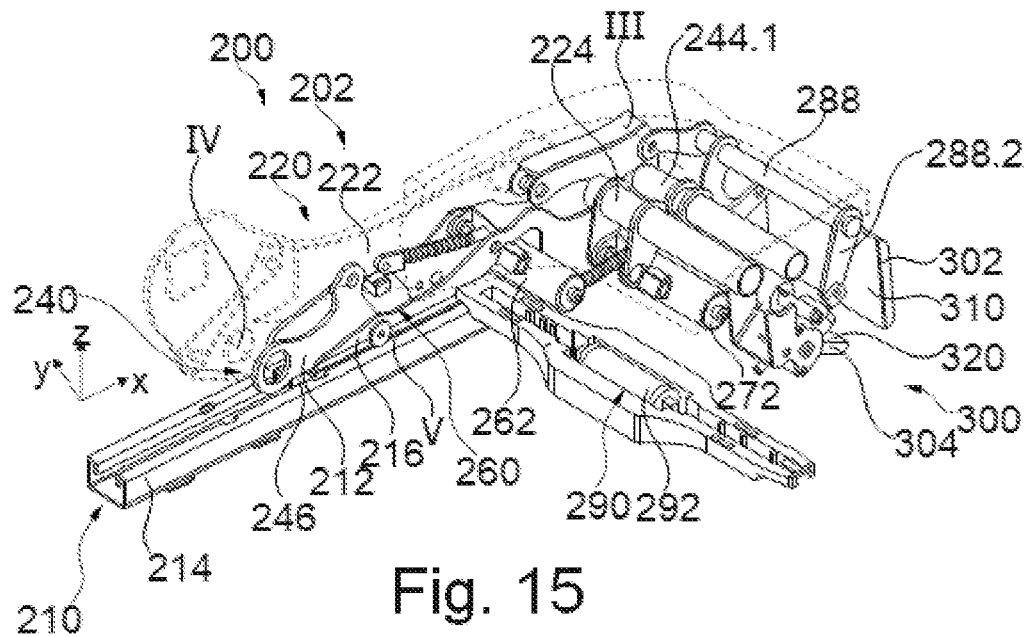
FIG. 15: shows a further fragmented, perspective sectional illustration through the vehicle seat and the lower leg support device from FIG. 11, illustrated in the non-use position.
Figure 16:
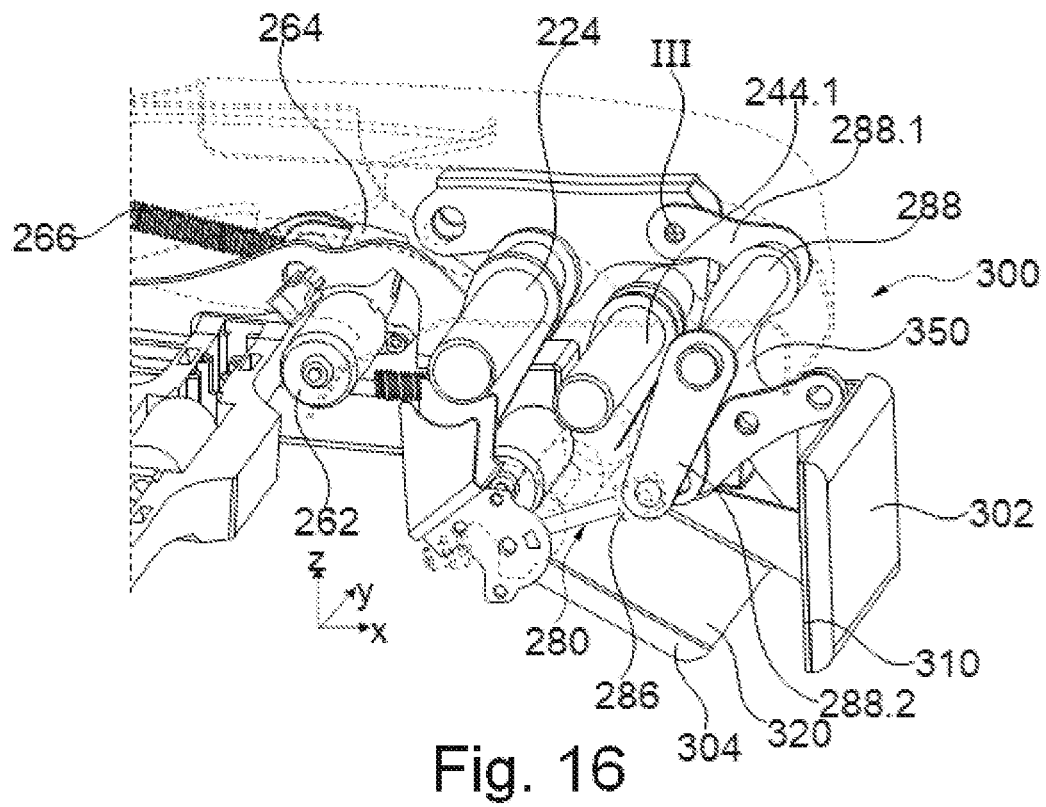
FIG. 16: shows a further fragmented, perspective sectional illustration through the vehicle seat and the lower leg support device from FIG. 11, illustrated in the non-use position.

FIGS. 1 to 10 show a vehicle seat 100 which by a lower leg support device 300 according to the invention is able to be upgraded to a vehicle seat 200 according to the invention, illustrated in FIGS. 11 to 16. The vehicle seat 200 according to the invention illustrated in FIGS. 11 to 16, with the exception of the additional lower leg support device 300, in terms of the construction thereof and the functions thereof corresponds to the vehicle seat 100 illustrated in FIGS. 1 to 10, unless otherwise described hereunder. However, a lower leg support device according to the invention is in principle also able to be combined with other vehicle seats known from the prior art.

The two vehicle seats 100, 200 hereunder are conjointly described to the extent that components/functions are described that are identical for both vehicle seats 100, 200.

The vehicle seats 100; 200 will be described hereunder while using three spatial directions running perpendicularly to one another. In a vehicle seat 100; 200 installed in a vehicle, a longitudinal direction x runs so as to be largely horizontal and preferably parallel to a vehicle longitudinal direction, the latter corresponding to the usual direction of travel of the vehicle. A transverse direction y, running perpendicularly to the longitudinal direction x, is likewise horizontally aligned in the vehicle and runs so as to be parallel to a vehicle transverse direction. A vertical direction z runs perpendicularly to the longitudinal direction x and perpendicularly to the transverse direction y. In a vehicle seat 100; 200 installed in a vehicle, the vertical direction z runs so as to be parallel to the vehicle vertical axis.

The positional designations and directional designations such as, for example, front, rear, left, right, top, bottom and transverse refer to a viewing direction of an occupant sitting in the usual seated position on a seat platform 102; 202 of the vehicle seat 100; 200, wherein the vehicle seat 100; 200 in the vehicle is installed in a use position suitable for transporting persons and with an upright backrest 104, and is aligned in the direction of travel as is customary. However, the vehicle seat 100; 200 can also be installed in an orientation deviating therefrom, for example transversely to the direction of travel. Unless otherwise described, the vehicle seat 100; 200 is constructed so as to be largely mirror-symmetrical in relation to a plane running perpendicularly to the transverse direction y.

The vehicle seat 100; 200 has the seat platform 102; 202 and the backrest 104 which via two fittings 106 is articulated on the seat platform 102; 202 so as to be adjustable for inclination. The backrest 104 presently is embodied as a so-called bending backrest, i.e. the backrest 104 has a plurality of backrest parts which are connected to one another in an articulated manner. Such a divided backrest is known from DE 689 02 020 T2, for example. The invention is however not limited to vehicle seats with bending backrests.

The vehicle seat 100; 200 can be embodied as a so-called integrated-belt seat in which a belt system is largely completely integrated in the vehicle seat 100; 200. An upper belt exit point here can be integrated in an upper region of the backrest 104. The invention is, however, not limited to integrated-belt seats.

The seat platform 102; 202 has a base 110; 210, a seat frame 120; 220, and an adjustment kinematics 140; 240 which is effective between the base 110; 210 and the seat frame 120; 220.

The base 110; 210 presently is a longitudinal adjuster which on both sides has in each case one seat rail 112; 212 and one floor rail 114; 214 which is able to be connected to a vehicle floor and on which the seat rail 112; 212 is guided so as to be displaceable. One adapter 116; 216 is in each case fastened to the seat rail 112; 212 on both sides. The adapter 116; 216 serves in particular for attaching elements of the adjustment kinematics 140; 240 to the base 110; 210.

The seat frame 120; 220 (when viewed in the transverse direction y) comprises on both sides in each case one seat frame side part 122; 222. Moreover, the seat frame 120; 220 has a front transverse tube 124; 224, and a rear transverse tube 126. The two seat frame side parts 122; 222 are disposed so as to be mutually spaced apart. The front transverse tube 124; 224 extends between the two seat frame side parts 122; 222 and is on both sides fixedly connected to a respective one of the two seat frame side parts 122; 222. The rear transverse tube 126 extends between the two seat frame side parts 122; 222 and is on both sides rotatably mounted on a respective one of the two seat frame side parts 122; 222. The seat frame side parts 122; 222 presently are in each case assembled from a plurality of sheet metal parts which are connected, preferably welded, to one another. Alternatively however, integral seat frame side parts can in each case also be used on both sides.

The adjustment kinematics 140; 240 (when viewed in the transverse direction y) presently has on both seat sides in each case one five-joint kinematics. Since the two five-joint kinematics are mirror-symmetrical in relation to one another, i.e. each one of five parallel rotation axes I, II, III, IV, V running in each case on both sides through a rotary joint of the five-joint kinematics, the adjustment kinematics 140; 240 hereunder is described as a five-joint kinematics. In the latter, all of the rotary joints are present twice, specifically (when viewed in the transverse direction y) in each case once on a right seat side and once on a left seat side of the vehicle seat 100; 200. Unless otherwise described hereunder, all of the components of the adjustment kinematics 140; 240 are thus present on the right seat side as well as on the left seat side.

The adjustment kinematics 140; 240 has on both sides in each case one first front linkage 142, one second front linkage 144, and one rear linkage 146. The first front linkage 142 is articulated on the bases 110; 210, presently the adapter 116; 216 of the base 110; 210, so as to be pivotable about a first rotation axis I. The second front linkage 144 is articulated on the first front linkage 142 so as to be pivotable about a second rotation axis II. The second front linkage 144 is articulated on the seat frame 120; 220 so as to be pivotable about a third rotation axis III. The rear linkage 146; 246 is articulated on the seat frame 120; 220 so as to be pivotable about a fourth rotation axis IV. The rear linkage 146; 246 is articulated on the base 110; 210, presently the adapter 116; 216 of the base 110; 210, so as to be pivotable about a fifth rotation axis V. The rotation axes I, II, III, IV, V run so as to be mutually parallel and parallel to the transverse direction y. Each of the rotation axes I, II, III, IV, V runs in each case so as to be spaced apart from all of the other rotation axes I, II, III, IV, V.

For providing a height-adjustment function, the adjustment kinematics 140; 240 has a first actuating drive 160; 260. A spacing between the base 110; 210 and the seat frame 120; 220 is adjustable by the first actuating drive 160; 260. To this end, the adjustment kinematics 140; 240 by activating the first actuating drive 160; 260 is adjustable in such a manner that an angle $\alpha_1$ between the first front linkage 142; 242 and the base 110; 210, an angle $\alpha_2$ between the first front linkage 142 and the second front linkage 144, an angle $\alpha_4$ between the seat frame 120; 220 and the rear linkage 146; 246, and an angle $\alpha_5$ between the rear linkage 146; 246 and the base 110; 210 are variable, wherein an angle $\alpha_3$ between the second front linkage 144 and the seat frame 120; 220 remains constant as long as a second actuating drive 170; 270 is not activated.

The two rear linkages 146; 246 presently are co-rotationally connected, in particular welded, to the rear transverse tube 126. The rear transverse tube 126, and thus the two rear linkages 146; 246, are mounted on the seat frame side parts 122; 222 of the seat frame 120; 220 so as to be rotatable about the fourth rotation axis IV.

The first actuating drive 160; 260 has an electric motor 162; 262, a gearbox 164; 264, a spindle nut and a spindle 166; 266. The spindle nut is a component part of the gearbox 164 that is able to be rotated and driven, and preferably disposed in a gearbox housing of the gearbox 164. The first actuating drive 160; 260 connects the 1s rear linkage 146; 246 and the base 110; 210 at an adjustable angle and preferably directly to one another, i.e. not by way of further gearbox members of the adjustment kinematics 140; 240. To this end, the spindle 166; 266 is articulated on the rear linkage 146; 246 so as be eccentric in relation to the fifth rotation axis V. The motor 162; 262 and the gearbox 164; 264 are fixedly connected to the adapter 116; 216 of the base 110; 210. The gearbox 164; 264 has the spindle nut which is able to be driven by the motor 162; 262 and into which the spindle 166; 266 is screwed. The spindle nut rotates by activating the motor 162; 262, so that the spindle 166; 266 is moved relative to the gearbox 164; 264 and the rear linkage 146; 246 is pivoted.

For providing an inclined position of the seat frame 120; 220 and of the backrest 104, the adjustment kinematics 140; 240 has the second actuating drive 170; 270. The seat frame 120; 220 in the front region thereof can be raised and pivoted about the fourth rotation axis IV by the second actuating drive 170; 270. The angle $\alpha_3$ between the second front linkage 144 and the seat frame 120; 220 is adjustable by the second actuating drive 170; 270, wherein the angle $\alpha_5$ between the rear linkage 146; 246 and the base 110; 210 however remains constant as long as the first actuating drive 160; 260 is not activated. The backrest 104, which is articulated on the seat frame 120; 220 by the fittings 106, is also rotated conjointly with the seat frame 120; 220, presently toward the rear about the fourth rotation axis IV, so that the inclined position of the seat frame 120; 220 of the backrest 104, and thus of the vehicle seat 100; 200, is provided.

In the inclined position, the seat frame 120 and the backrest 104 in relation to an upright position are in each case inclined toward the rear about an axis parallel to the transverse direction y, such that a partially reclined position of the vehicle driver during an autonomous driving operation is made possible. The upright position of the vehicle seat 100; 200 corresponds to a seat position in which the seat occupant can safely assume control of the vehicle once the autonomous driving operation has been switched off.

The second actuating drive 170; 270 has an electric motor 172; 272, a gearbox 174; 274, a spindle nut and a spindle 176; 276. The second actuating drive 170; 270 connects the seat frame 120; 220 and the second front linkages 144 to one another at an adjustable angle. To this end, the two front linkages 144 are connected to one another by a connecting tube 144.1; 244.1. The connecting tube 144.1; 244.1 runs so as to be parallel to but spaced apart from the second rotation axis II and the third rotation axis III. The spindle 176; 276 is connected in an articulated manner to a radially projecting lever arm 144.2; 244.2 of the connecting tube 144.1; 244.1. The connecting tube 144.1; 244.1 is disposed in front of the front transverse tube 124; 224.

For providing a seat face inclination adjuster, the vehicle seat 100; 200 has a third actuating drive 180; 280. A seat face cushion carrier not illustrated in the figures carries a cushion which has a seat face for an occupant of the vehicle seat 100; 200. An angle between the seat face and the longitudinal direction x can be adjusted by the seat face inclination adjuster without the angle of the backrest 104 relative to the vertical direction z being changed in the process.

The third actuating drive 180; 280 has an electric motor 182, a gearbox 184, a spindle nut and a spindle 186; 286. The third actuating drive 180; 280 connects the seat frame 120; 220 and a support tube 188; 288 to one another at an adjustable angle and preferably directly, i.e. not by way of further gearbox members. The support tube 188; 288 presently by two bearing plates 188.1; 288.1 is articulated on the seat frame 120; 220 so as to be pivotable eccentrically about the third rotation axis III. The spindle 186; 286 is connected in an articulated manner to a radially projecting lever arm 188.2; 288.2 of the support tube 188; 288. In a variant of the exemplary embodiment, the support tube can however also be pivotable about a different rotation axis.

The seat face cushion carrier is, for example, a seat shell, in particular made from a deep-drawn metal sheet or a plastics material. The seat face cushion carrier is articulated on the seat frame 120; 220 so as to be pivotable about a sixth rotation axis VI. Moreover, the seat face cushion carrier bears pivotably on the support tube 188; 288. The support tube 188; 288 (when viewed in the longitudinal direction x) is disposed in front of the sixth rotation axis VI.

As a result of the seat face cushion carrier being articulated on the seat frame so as to be pivotable about the sixth rotation axis VI and the support tube 188; 288 by the third actuating drive 180; 280 being pivotable eccentrically in relation to the seat frame 120; 220, presently about the third rotation axis III, an angle between the seat face cushion carrier, and thus the seat face, and the seat frame 120; 220 is adjustable by the third actuating drive 180; 280.

A fourth actuating drive 190; 290 serves for the longitudinal adjustment, i.e. for displacing the seat rail 112; 212 relative to the floor rail 114; 214. The fourth actuating drive 190; 290 in a manner known per se has an electric motor 192; 292, a gearbox, a spindle nut and a spindle.

The vehicle seat 100; 200 is largely mirror-symmetrical in relation to a plane running perpendicularly to the transverse direction y and, in particular on both sides, has in each case one first actuating drive 160; 260, in each case one second actuating drive 170; 270 and in each case one fourth actuating drive 190; 290. The third actuating drive 180; 280 (when viewed in the transverse direction y) is centrically disposed and present only once. In a variant of the exemplary embodiment, one or a plurality of the other actuating drives 160; 260, 170; 270, 190; 290 may also be present on only one side.

A second exemplary embodiment of a vehicle seat, not illustrated in the figures, with the exception of the points of differentiation described hereunder, corresponds to the exemplary embodiments which have been described above and are illustrated in the figures. The vehicle seat of the second exemplary embodiment likewise has a first actuating drive having an electric motor, a gearbox, a spindle nut and a spindle. In contrast to the exemplary embodiments described above, however, the motor and the gearbox are not connected to the adapter of the base but to a seat frame side part.

A third exemplary embodiment, not illustrated in the figures, with the exception of the points of differentiation described hereunder, corresponds to the exemplary embodiments which have been described above and are illustrated in the figures. In the vehicle seat of the third exemplary embodiment, the connecting tube which connects the two second front linkages is however disposed behind the front transverse tube. In a variant of the third exemplary embodiment, the motor and the gearbox of the first actuating drive are moreover connected to a seat frame side part, as in the second exemplary embodiment.

Described hereunder by way of FIGS. 11 to 16 is the lower leg support device 300 according to the invention, which is a component part of the vehicle seat 200 according to the invention. The lower leg support device 300 according to the invention is likewise able to be connected to the vehicle seat 100, as a result of which the vehicle seat 100 is able to be upgraded to a vehicle seat 200 according to the invention.

The lower leg support device 300 has a first upholstery part 302 and a second upholstery part 304 which are able to be transferred from a use position to a non-use position. In the use position, the first upholstery part 302 and the second upholstery part 304 serve for supporting the lower legs of an occupant sitting in the vehicle seat 200. In the non-use position, the upholstery parts 302, 304 are folded downwards in such a manner that the upholstery parts 302, 304 do not touch the lower legs of the occupant.

The two upholstery parts 302, 304 are in each case embodied so as to be almost flat. In the use position, the two upholstery parts 302, 304 are aligned so as to be almost horizontal, conjointly forming a support surface for the upper legs, wherein this support surface is disposed in front of a seat face carried by the seat platform 202. In the use position, the second upholstery part 304 is disposed in front of the first upholstery part 302. In the none-use position, the first upholstery part 302 is folded downwards and as a result disposed so as to be largely vertical. In the none-use position, the second upholstery part 304 in relation to the use position is pivoted towards the rear by almost (or more than) 180 degrees about an axis running parallel to the transverse direction y, such that the upholstered surface of the second upholstery part 304 points downwards. The second upholstery part 304 in the non-use position, proceeding from a lower end region of the first upholstery part 302 and at an angle in relation to the first upholstery part 302, runs towards the rear.

The first upholstery part 302 preferably has a foam part and a seat cover, in particular made from a fabric or a leather. The first upholstery part 302 is fixedly connected to the first cushion carrier 310. The first cushion carrier 310 carries the first upholstery part 302 so that a movement of the first cushion carrier 310 causes a movement of the first cushion 302.

The second upholstery part 304 preferably has a foam part and a seat cover, in particular made from a fabric or a leather. The second upholstery part 304 is fixedly connected to the second cushion carrier 320. The second cushion carrier 320 carries the second upholstery part 304 so that a movement of the second cushion carrier 320 causes a movement of the second cushion 304.

For transferring the upholstery parts 302, 304 from the non-use position thereof to the use position thereof, the lower leg support device 300 has a coupling gear assembly. The coupling gear assembly, when viewed in the transverse direction y, on both sides of the seat of the vehicle seat 200 has in each case one coupling gear 330. A variant of the exemplary embodiment may have only exactly one coupling gear which is preferably centrically disposed.

The two coupling gears 330 are constructed so as to be functionally identical, in particular so as to be mirror-symmetrical in relation to one another, so that only one of the two coupling gears 330 is described hereunder. The two cushion carriers 310, 320 connect the two coupling gears 330 to one another.

The coupling gear 330 has a drive linkage 340 and a support linkage 350. The coupling gear 330 is articulated on the seat platform 202 by the drive linkage 340 and the support linkage 350.

The drive linkage 340 is co-rotationally connected to the connecting tube 244.1, presently up to a critical load acting on the coupling gear 330. As a result of the connecting tube 244.1 connecting the two second front linkages to one another, and the two second front linkages being pivotable about the second rotation axis II, the drive linkage 340, conjointly with the connecting tube 244.1, also pivots about the second rotation axis II. A first joint of the coupling gear 330 (formed by way of the articulated connection between the first front linkage and the second front linkage) enables a pivoting movement of the drive linkage 340 about the second rotation axis II.

The drive linkage 340 presently is constructed in multiple parts, but a different embodiment of a lower leg support device according to the invention may also have an integral drive linkage.

The drive linkage 340 has a first linkage part 342 and a second linkage part 344. The two linkage parts 342, 344 are co-rotationally connected to one another up to the critical load by a spring device 346, presently a leg spring. The first linkage part 342 presently is formed by the lever arm 244.2 which is fixedly connected to the connecting tube 244.1. The second linkage part 344 is mounted on the connecting tube 244.1 so as to be rotatable but offset in relation to the first joint G1 (the second rotation axis II). The spring device 346 preloads the first linkage part 342 and the second linkage part 344 in relation to one another in such a manner that the first linkage part 342 and the second linkage part 344 are rigidly coupled to one another until the critical load is reached. When the critical load is exceeded, the second linkage part 344 can rotate about the connecting tube 244.1 relative to the first linkage part 342, as a result of which the coupling gear 330 is protected against destruction by an abusive load which is introduced in particular by way of the upholstery parts 302, 304.

The drive linkage 340 is pivotable by a drive device, presently the second actuating drive 270. To this end, the spindle 276 drives the first linkage part 342, presently identical to the lever arm 244.2. In a variant of the exemplary embodiment however, an actuating drive, which is configured separately from the second actuating drive 270, can also be used for driving the drive linkage 340.

The support linkage 350 is fixedly connected to the first cushion carrier 310. The support linkage 350, in an end region that faces away from the first cushion carrier 310, is mounted so as to be pivotable about a pivot axis running parallel to the transverse direction y by a second joint G2. The second joint G2 presently is formed by a pivotable mounting of the support linkage 350 on the support tube 288.

The drive linkage 340 is connected to the support linkage 350 by a coupling member 360. To this end, an end region of the second linkage part 344 of the drive linkage 340 is connected to the coupling member 360 by a third joint G3. The third joint G3 presently is configured as a rotary sliding joint which enables a pivoting movement as well as a limited relative displacement between the second linkage part 344 and the coupling member 360. To this end, the coupling member 360 in an end region has a slot 362 in which a pin engages, the latter preferably being connected to the second linkage part 344. In a variant of the exemplary embodiment, the third joint G3 can be configured as a pure rotary joint.

A fourth joint G4 is configured as a rotary joint. The fourth joint G4 connects the coupling member 360 to the support linkage 350 so as to be pivotable about an axis parallel to the transverse direction y.

A fifth joint G5 presently is configured as a rotary sliding joint. The fifth joint G5 enables a pivoting movement as well as a limited relative displacement between the coupling member 360 and a coupler 370. To this end, the coupler 370 in an end region has a slot 372 in which a pin engages, the latter preferably being connected to the coupling member 360.

The fourth joint G4 is disposed between the third joint G3 and the fifth joint G5. As a result, pivoting the coupling member 360 about the fourth joint G4 causes the third joint G3 and the fifth joint G5 to pivot in the same direction of rotation but in opposite directions in terms of the longitudinal direction x. In a variant of the exemplary embodiment, the fifth joint G5 can be configured as a pure rotary joint.

An end region (which in the use position is a front end region) of the first cushion carrier 310 is connected to an end region (which in the use position is a rear end region) of the second cushion carrier 320 so as to be pivotable about a pivot axis parallel to the transverse direction y by a sixth joint G6. The second cushion carrier 320 is connected to the coupler 370 so as to be pivotable eccentrically in relation to the sixth joint G6 about a pivot axis parallel to the transverse direction y by a seventh joint G7.

The first joint, the second joint G2, the fourth joint G4, the sixth joint G6, and the seventh joint G7 are configured as pure rotary joints. The third joint G3 and the fifth joint G5 are in each case configured as a rotary sliding joint so as to influence a motion sequence between the use position and the non-use position in a targeted manner by using free travel. In a variant of the exemplary embodiment, the third joint G3 and/or the fifth joint G5 can however also be embodied as a pure rotary joint.

The second actuating drive 270 is activated for transferring the two cushion carriers 310, 320, or the upholstery parts 302, 304 fastened thereto, from the non-use position to the use position. As a result, the spindle 274 pivots the drive linkage 340. The two cushion carriers 310, 320 are transferred to the use position by the coupling gear 330 described above. For transferring the two cushion carriers 310, 320 from the use position to the non-use position, the coupling gear 330 is correspondingly activated in the opposite direction by the second actuating drive 270.

The features disclosed in the above description, the claims and the figures can be relevant to the implementation of the invention in the various design embodiments of the latter individually or else in combination, as long as said design embodiments remain within the scope of the claims.

LIST OF REFERENCE SIGNS

- 100; 200 Vehicle seat
- 102; 202 Seat platform
- 104 Backrest
- 106 Fitting
- 110; 210 Base
- 112; 212 Seat rail
- 114; 214 Floor rail
- 116; 216 Adapter
- 120; 220 Seat frame
- 122; 222 Seat frame side part
- 124; 224 Front transverse tube
- 126 Rear transverse tube
- 140; 240 Adjustment kinematics
- 142 First front linkage
- 144 Second front linkage
- 144.1; 244.1 Connecting tube
- 144.2; 244.2 Lever arm
- 146; 246 Rear linkage
- 160; 260 First actuating drive
- 162; 262 Electric motor
- 164; 264 Gearbox
- 166; 266 Spindle
- 170; 270 Second actuating drive, drive device
- 172; 272 Electric motor
- 174; 274 Gearbox
- 176; 276 Spindle
- 180; 280 Third actuating drive
- 182 Electric motor
- 184 Gearbox
- 186; 286 Spindle
- 188; 288 Support tube
- 188.1; 288.1 Bearing plate
- 188.2; 288.2 Lever arm
- 190; 290 Fourth actuating drive
- 192; 292 Electric motor
- 300 Lower leg support device
- 302 First upholstery part
- 304 Second upholstery part
- 310 First cushion carrier
- 320 Second cushion carrier
- 330 Coupling gear
- 340 Drive linkage
- 342 First linkage part
- 344 Second linkage part
- 346 Spring device
- 350 Support linkage
- 360 Coupling member
- 362 Slot
- 370 Coupler
- 372 Slot
- G2 Second joint
- G3 Third joint
- G4 Fourth joint
- G5 Fifth joint
- G6 Sixth joint
- G7 Seventh joint
- $\alpha_1$ Angle
- $\alpha_2$ Angle
- $\alpha_3$ Angle
- $\alpha_4$ Angle
- $\alpha_5$ Angle
- I First rotation axis
- II Second rotation axis
- III Third rotation axis
- IV Fourth rotation axis
- V Fifth rotation axis
- VI Sixth rotation axis
- x Longitudinal direction
- y Transverse direction
- z Vertical direction

The invention claimed is:

1. A lower leg support device for a vehicle seat, comprising: a first cushion carrier, a second cushion carrier, which is connected in an articulated manner to the first cushion carrier, and a coupling gear for transferring the first cushion carrier and the second cushion carrier from a non-use position to a use position, wherein the coupling gear is able to be driven by a drive device, wherein the coupling gear has a drive linkage comprised of a first linkage part and a second linkage part wherein the first and second linkage parts are rotationally connected together up to a critical load by a spring device, wherein the spring device is a leg spring having a main body and two legs, wherein the main body at least partially encircles a connecting tube to which the first linkage part and the second linkage part are connected, and wherein the legs cross and then diverge from one another.

2. The lower leg support device according to claim 1, wherein the coupling gear is able to be driven by exactly one drive device.

3. The lower leg support device according to claim 1, wherein the first cushion carrier in the non-use position is pivoted in such a manner about an axis running parallel to a transverse direction that an upholstered surface of a first upholstery part fastened to the first cushion carrier points predominantly towards the front.

4. The lower leg support device according to claim 1, wherein the second cushion carrier in the non-use position is pivoted in such a manner about an axis running parallel to a transverse direction that an upholstered surface of a second upholstery part fastened to the second cushion carrier points predominantly downward.

5. The vehicle seat for use with an autonomously driving motor vehicle comprising the lower leg support device according to claim 1.

6. The vehicle seat according to claim 5, wherein the vehicle seat has a seat platform and a backrest articulated on the seat platform, the seat platform having a base, a seat frame and an adjustment kinematics which is effective between the base and the seat frame and is embodied as a five-joint kinematics.

7. The vehicle seat according to claim 6, wherein the adjustment kinematics has a first front linkage, a second front linkage and a rear linkage, wherein the first front linkage is articulated on the base so as to be pivotable about a first rotation axis, the second front linkage is articulated on the first front linkage so as to be pivotable about a second rotation axis, the second front linkage is articulated on the seat frame so as to be pivotable about a third rotation axis, the rear linkage is articulated on the seat frame so as to be pivotable about a fourth rotation axis, and the rear linkage is articulated on the base so as to be pivotable about a fifth rotation axis.

8. The vehicle seat according to claim 7, wherein for providing a height-adjustment function, an angle between the first front linkage and the base, and an angle between the rear linkage and the base, are variable by a first actuating drive, wherein an angle between the second front linkage and the seat frame remains constant.

9. The vehicle seat according to claim 7, wherein for providing an inclined position of the seat frame and the backrest, an angle between the second front linkage and the seat frame can be variable by a second actuating drive.

10. The vehicle seat according to claim 9, wherein the drive device of the lower leg support device is formed by the second actuating drive.

11. The lower leg support device for a vehicle seat of claim 1, wherein the first linkage part is in contact with the drive device and the first and second linkage parts have first end portions mounted on the same connecting tube.

12. The lower leg support device for a vehicle seat of claim 11, wherein the first linkage part is fixedly connected to the connecting tube.

13. The lower leg support device for a vehicle seat of claim 11, wherein the second linkage part is rotatably connected to the connecting tube.

14. The lower leg support device for a vehicle seat of claim 1, wherein the spring device preloads the first linkage part and the second linkage part with respect to one another to couple the first and second linkage parts until the critical load is reached.

15. The lower leg support device for a vehicle seat of claim 11, wherein when the critical load is reached, the second linkage part rotates about the connecting tube relative to the first linkage part.

16. The lower leg support device for a vehicle seat of claim 1, wherein the first linkage part and the second linkage part are co-rotationally connected to one another up to the critical load by the spring device.

17. The lower leg support device for a vehicle seat of claim 1, wherein the second linkage part is mounted on a connecting tube to be rotatable but offset in relation to a first joint comprising a rotational axis.

* * * * *